United States Patent
Do et al.

(10) Patent No.: US 9,280,569 B2
(45) Date of Patent: Mar. 8, 2016

(54) SCHEMA MATCHING FOR DATA MIGRATION

(75) Inventors: Hong-Hai Do, Dresden (DE); Christian Drumm, Karlsruhe (DE); Matthias Schmitt, Speyer (DE)

(73) Assignee: SAP SE, Walldorf (DE)

(*) Notice: Subject to any disclaimer, the term of this patent is extended or adjusted under 35 U.S.C. 154(b) by 2189 days.

(21) Appl. No.: 12/116,352

(22) Filed: May 7, 2008

(65) Prior Publication Data

US 2008/0281820 A1 Nov. 13, 2008

(30) Foreign Application Priority Data

May 8, 2007 (EP) .................................... 07009246

(51) Int. Cl.
G06F 17/30 (2006.01)

(52) U.S. Cl.
CPC ........ *G06F 17/303* (2013.01); *G06F 17/30292* (2013.01); *G06F 17/30914* (2013.01)

(58) Field of Classification Search
CPC .................. G06F 17/30914; G06F 17/30292; G06F 17/303
USPC .................................. 707/809, 803, E17.125
See application file for complete search history.

(56) References Cited

U.S. PATENT DOCUMENTS

| | | | | |
|---|---|---|---|---|
| 7,493,388 B2* | 2/2009 | Wen | .......................... | G06F 9/50 705/28 |
| 2005/0060332 A1* | 3/2005 | Bernstein | .......... | G06F 17/30569 707/E17.005 |
| 2007/0055655 A1* | 3/2007 | Bernstein | .......... | G06F 17/30292 707/E17.005 |
| 2008/0027930 A1* | 1/2008 | Bohannon | ......... | G06F 17/30598 707/E17.044 |
| 2008/0235260 A1* | 9/2008 | Han | .................... | G06F 17/2247 707/E17.005 |

OTHER PUBLICATIONS

Erhard Rahm, Philip A. Bernstein, "A Survey of Approaches to Automatic Schema Matching", The VLDB Journal 10:334-350 (2001).
Pavel Shvaiko and Jerome Euzenat, "A survey of Schema-Based Matching Approaches," University of Trento, Povo, Trento, Italy, Journal on Data Semantics, IV, LNCS 3730, pp. 146-171, 2005.

* cited by examiner

*Primary Examiner* — Phong Nguyen
(74) *Attorney, Agent, or Firm* — Fountainhead Law Group PC

(57) ABSTRACT

Embodiments include a system for matching an element of a source schema to an element of a target schema. The system includes a processing unit and a communication unit. The processing unit may be configured to: identify a sample data item of the element of the target schema; match a part of the sample data item to a part of a sample instance of the source schema; and match the element of the source schema to which the part of the sample instance of the source schema belongs to the element of the target schema. The communication unit may be configured to: provide the sample data item through an interface and receive the sample instance of the source schema.

20 Claims, 9 Drawing Sheets

| Source schema Customer table | Target schema Customer table | Mapping function |
|---|---|---|
| Customer | Name | Move function |
| Address | StreetName HouseID | Split function |
| TelephoneCountryCode TelephoneNumber | TelephoneNumber | Concatenate function |
| CountryCode | CountryCode | Value mapping function |
|  | LegalFormCode | Default value function |
| Additional Field | POBoxNumber | Code2Text function |

Fig. 5

SCHEMA MATCHING FOR DATA MIGRATION

CROSS REFERENCE TO RELATED APPLICATIONS

This invention claims the benefit of priority from European Patent Application No. 07009246.5, filed on May 8, 2007, entitled "Schema Matching for Data Migration," the disclosure of which is hereby incorporated herein by reference.

TECHNICAL FIELD

Embodiments of the present invention relate generally to the field of electronic data processing and more specifically to conversion of data between different storage systems.

BACKGROUND

Today, computer systems are frequently used to support many different kinds of activities. As an example, companies or organizations may use a computer system to host an application program for processing business data. In such examples, the amount of processed data may be large and the data is stored in data storage systems. The data storage systems may be described by a schema. A data storage system may for example be a relational database system and the schema may describe the tables of the database system and the relations between the fields of the tables.

An application program may access data that is stored in a data storage system, process the data and store new or modified data. Accordingly, the data may be organized in the data storage system so that the application program can access and store data in an efficient way. A company may desire to change the way the data are processed or the way the data are stored. As an example, a company may desire to exchange an application program in use, for example a legacy system, by a new application program. The new application program may model the data processing in a different way and this may require storing the data in a data storage system in a different way. The company may then migrate data from a source data storage system that is in use to a target data storage system that is intended to be used in the future. The source data storage system may be organized according to a source schema and the target data storage system may be organized according to a target schema.

SUMMARY

The source schema may be matched to the target schema and the matching relations may be used to convert data from a source data storage system to a target data storage system. Embodiments of the invention address how to match a part of the source schema to a part of the target schema.

An embodiment may be a system for matching an element of the source schema to an element of the target schema. An element of a schema may for example be a unit of the schema such as a field of a data base table modelled according to the schema. The system may match a sample data item of the target schema to a part of a sample instance of the source schema. The sample data item may be a part of an instance of the target schema. The sample data item is related to an element of the target schema and accordingly the part of the sample instance of the source schema may be related to an element of the source schema. Using the match between the sample data item and the part of the sample instance of the source schema the system may match the element of the target schema to the element of the source schema.

The system is reliable and efficient with respect to computer resources compared to a system that directly matches schemas without using sample data. A source schema and a target schema may have different structures and different element names. In such a case, the available criteria for a direct match between schemas without using sample data may be insufficient and accordingly the results may be unreliable. Furthermore, available criteria for a direct match between schemas without using sample data may require more complicated methods to decide how to match the schemas. The system according to an embodiment may use sample data that allow for a reliable and efficient match of parts of the sample data and accordingly for a reliable and efficient match of schemas. Frequently, the number of elements of the source schema or the target schema may be large so that a manual matching procedure may also be unreliable because a consistent matching of many elements may be difficult. A manual matching procedure may also be inefficient and time consuming when supported by a graphical user interface of a software program.

A further embodiment may be a method for matching an element of the source schema to an element of the target schema. The method may include matching a sample data item of the target schema to a part of a sample instance of the source schema. The matching result between the sample data item and the part of the sample instance may be used to match an element of the target schema to an element of the source schema.

The method is reliable and efficient with respect to computer resources compared to a method directly matching between schemas without using sample data. The method, according to an embodiment, may use sample data that allow for a reliable and efficient match of parts of the sample data and accordingly for a reliable and efficient match of schemas.

An embodiment may be a computer program product for matching an element of the source schema to an element of the target schema. The computer program product includes features of the method for matching an element of the source schema to an element of the target schema. Accordingly, the computer program product may be able to be reliable and efficient with respect to computer resources.

BRIEF DESCRIPTION OF THE DRAWINGS

FIG. 5 is an example table of matches between source schema elements and target schema elements and mapping functions to migrate data according to the matches.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
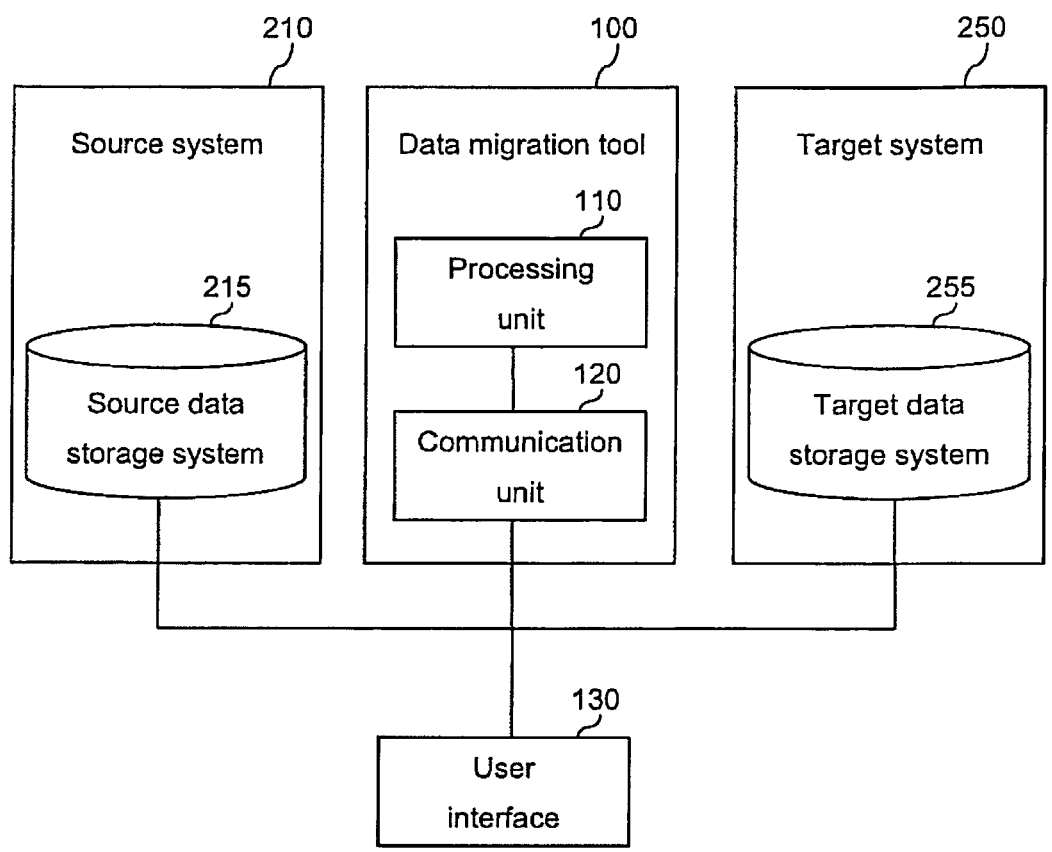
FIG. 1 is a block diagram of an example system, according to an embodiment, a source system, and a target system.

FIG. 1 is a block diagram of an example system 100, according to an embodiment, a source system 210, and a target system 250. The example system 100 is a data migration tool 100 that includes a processing unit 110 and a communication unit 120. A user interface 130 may be communicatively coupled to the communication unit 120. The source system 210 has a source data storage system 215 and the target system 250 has a target data storage system 255. The user interface 130 may be communicatively coupled to the source data storage system 215 and the target data storage system 255. Lines between different blocks of the diagram indicate a communicative coupling between elements represented by the blocks that allows for a data exchange in both directions.

The data migration tool 100 may be used for matching an element of a source schema describing the source data storage system 215 to an element of a target schema describing the target data storage system 255. In a further example, the data migration tool 100 may be used for matching elements of different schemas that are not related to application programs or data migration. In a further example, the data migration tool 100, the source data storage system 215, and the target data storage system 255 may each have specific and different user interfaces.

The processing unit 110 may be configured to identify a sample data item of the element of the target schema. The sample data item may be identified as a part of a sample instance of the target schema. The sample instance of the target schema may have been retrieved from the target data storage system 255 using the communication unit 120. In a further example, the sample data item may be identified from a set of sample data items that may have been entered by a user through the user interface 130.

The communication unit 120 may be configured to provide the sample data item that has been identified by the processing unit 110 through the user interface 130. The user interface may include an output device such as a monitor and an input device such as a keyboard or a mouse. A user may use the sample data item to create a data record that may be stored as a sample instance of the source schema in the source data storage system 215. This may be done for example by using an application program of the source system 210 that interacts with the source data storage system 215. In a further example, the sample data item may be provided through an interface to a software program to create the sample instance of the source schema without a user interaction. The software program may be an application program of the source system or may be a further program configured to store date in the source data storage system 215.

The communication unit 120 may be configured to receive the sample instance of the source schema. In an example, the sample instance of the source schema may be received in response to a request that the communication unit 120 sends to an application program of source system 210. In a further example, a user may trigger through the user interface 130 that the sample instance of the source schema is sent to the communication unit 120.

The processing unit 110 may be configured to match a part of the sample data item to a part of the sample instance of the source schema. In an example, the sample data item may be a part of a sample instance of the target schema and a content of a field of a database table of the target data storage system 255. The part of the sample data item may be identical with the content of the field and the part of the sample instance of the source schema may be identical with a content of a further field. In such cases, a string comparison routine may be used to match the sample data item to a set of field contents representing the sample instance of the source schema. The string comparison routine may also take into account conversions between strings being a part of the sample data item and strings being part of the sample instance of the source schema. In case that a part of the sample data item is less than the sample data item, that is, the part does not include all data of the sample data item, a search routine for substrings in a larger string may be used. Furthermore, a search for string splits may be used. The search may be an automated and systematic search for string splits or may be for a part of a standard data format that may be specified by metadata related to a part of the sample data item. Similarly, to match a part of the sample data item a search for string concatenations may be used.

The processing unit 110 may be configured to match the element of the source schema to which the part of the sample instance of the source schema belongs to the element of the target schema. In an example, the part of the sample data item may be a content of a field and the processing unit 110 identifies the field and the table, i.e. the element, of the target schema to which the content belongs. Similarly, the part of the sample instance may be a content of a further field and the processing unit 110 identifies the field and the table, i.e. the element, of the source schema to which the content belongs. The identified field and the table of the source schema may then be matched to the identified field and table of the target schema. The resulting match between the element of the source schema and the element of the target schema may be stored for example in a results table or results list. A results table may be displayed to the user through user interface 130 as a table. In a further example, the results table can be represented by two lists representing the elements of the source schema and the target schema and arrows representing matches between the elements. A system for migrating the data from the source data storage system 215 to the target data storage system 255 may then be able to access the results table to execute the data migration. In an example, the data migration tool 100 may access the results table to execute the data migration.

The data migration tool 100 may include as hardware a computer system such as a personal computer (PC), a server, a plurality of servers configured to execute software programs, or a mainframe computer system. The data migration tool 100 may include a client and a server related according to a client-server architecture or may include one or more peer computers arranged in a peer-to-peer or distributed architecture. In a further example, the data migration tool 100 may include a plurality of individual computer systems that are connected by the Internet or by an intranet of an entity such as for example a company or an organization.

The hardware of the data migration tool 100 may run, for example by hosting and executing, a program that configures the data migration tool 100 to have characterizing features. Components of the data migration tool 100 may include software units that represent encapsulated or distributed instructions. Such software units may be executed by the hardware of the data migration tool 100 and may provide characterizing features of the units. One or more units of the data migration tool 100 may be designed as a web application.

The data migration tool 100 may be part of a computer system that hosts also the source system 210 and the target system 250. Such a computer system may also include the user interface 130. In a further example, the source system 210 may be a separate computer system with hardware similar to or different from the hardware of data migration tool 100. The source system 210 may include a server for running a legacy application program or an application program to be replaced and a separate database server for running the source data storage system 215. In a further example, the application program to be replaced and the source data storage system 215 may run on one server or PC. Similarly, the target system 250 may be a separate computer system with hardware similar to or different from the hardware of data migration tool 100 or of the source system 210. Accordingly, the target system 250 may include a server for running an application program to be used in the future and a separate database server for running the target data storage system 255. In a further example, the application program to be used in the future and the target data storage system 255 may run on one server or PC.

Figure 2A:
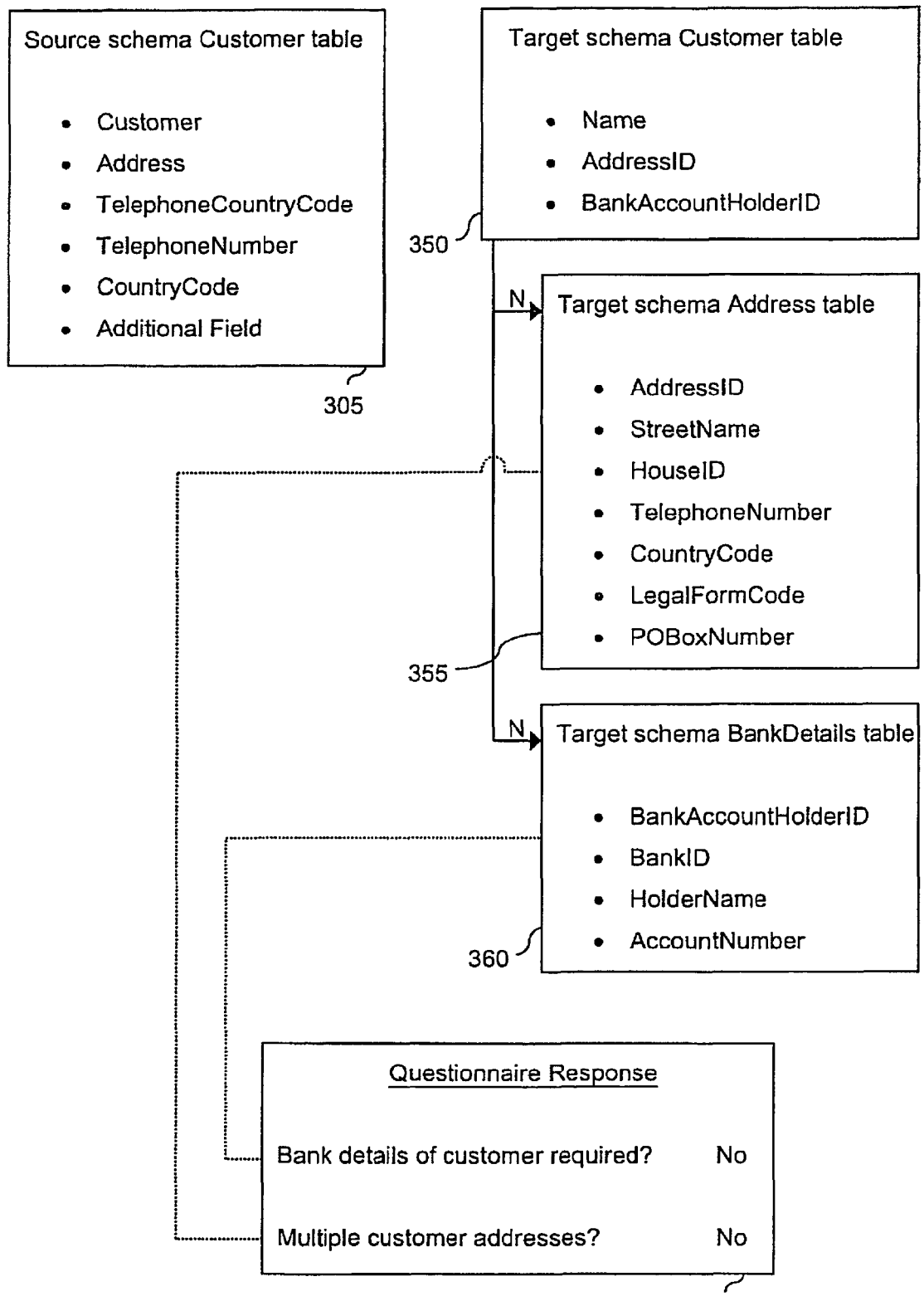
FIG. 2A is a block diagram of an example source schema and an example initial target schema.

FIG. 2A is a block diagram of an example source schema and an example initial target schema. The example source schema is a source schema Customer table 305 of a source schema. The example initial target schema includes a target schema Customer table 350, a target schema Address table 355, and a target schema BankDetails table 360 of a target schema. The cardinality of the target schema Address table 355 and the target schema BankDetails table 360 is N. The tables are represented by diagram blocks that include also fields of the tables, that is, elements of the schemas to which the tables belong. In the example, a user input is represented by a questionnaire response document 365.

In an example, the questionnaire response document 365 may have been filled in by a user having knowledge about the business processes that are modelled by an application program to be used in the future. Frequently, the application program to be used in the future and accordingly the initial target schema may be able to model more complex business processes than required by a company. In such cases, a reduction of the initial target schema may reduce the number of potential match elements on the side of the reduced target schema and this may increase reliability and runtime of the data migration tool. For a target schema reduction, the processing unit 110 may be configured to select the element of the target schema to be matched from elements of the initial target schema. A selection may be according to selection criteria that are computed in response to a user input, for example, the questionnaire response 365. In a further example, the questionnaire may be used to make the target schema more similar to the source schema in order to facilitate the matching. Accordingly, the questionnaire response document 365 may have been filled in by a user having knowledge about the application program to be replaced or the source schema.

The answer to the first question of the questionnaire response 365 is that bank details are not required. The first question is related to the target schema BankDetails table 360 and the relation is represented by a dotted line. According to the negative answer to the first question, selection criteria may be computed stating that elements or fields of the target schema BankDetails table 360 are not selected for the reduced target schema. In a further example, a positive answer to the first question may lead to selection criteria that all elements belonging to the target schema BankDetails table 360 are selected for the reduced target schema.

The answer to the second question of the questionnaire response 365 is that multiple customer addresses are not required. The second question is related to the target schema Address table 355 and the relation is represented by a dotted line. According to the negative answer to the first question, selection criteria may be computed stating that elements of the target schema Address table 355 are not selected for the reduced target schema.

The source schema Customer table 305, the target schema Customer table 350, the target schema Address table 355, and the target schema BankDetails table 360 may be described by schemas in a machine-readable format. Such machine-readable metadata may be stored or be accessible in the data migration tool 100 (see FIG. 1). In a further example, such schema tables may not be accessible to the data migration tool but to the source system 210 (see FIG. 1) and the target system 250 (see FIG. 1) respectively. In a further example, the target schema and the source schema may be created by the data migration tool 100 using as input information how the tables of a target database are related and how the tables of a source database are related.

Figure 2B:
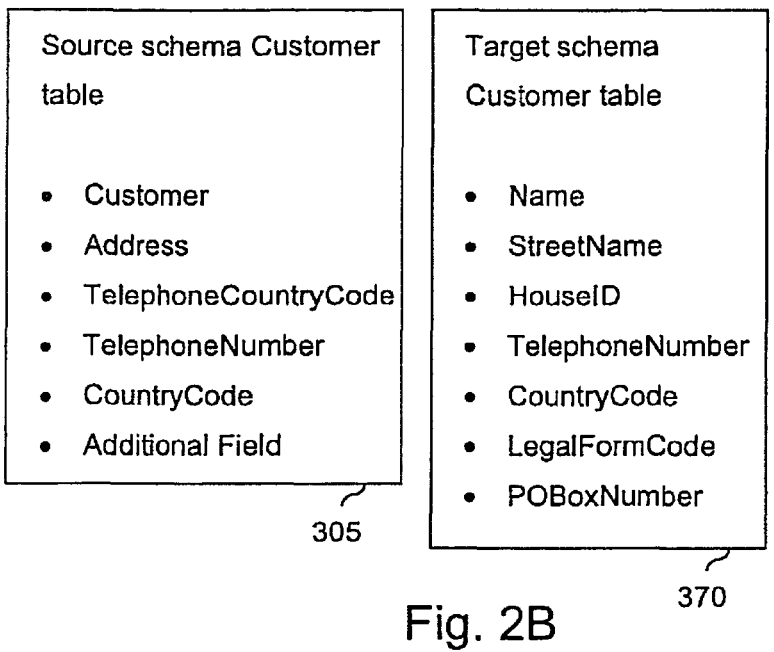
FIG. 2B is a block diagram of an example source schema and an example target schema reduced according to an embodiment.

FIG. 2B is a block diagram of an example source schema 305 and an example target schema 370 reduced according to an embodiment. According to computed selection criteria, elements of target schema BankDetails table 360 and target schema Address table 355 are not selected for the reduced target schema. Furthermore, the target schema has been reduced to a single target schema Customer table 370. In an example, the reduction of an initial target schema may be transferred to the target system 250 and may be used to reduce the database tables of the target data storage system 255 (see FIG. 1) accordingly. In a further example, a reduction of the target schema may directly lead to a corresponding reduction of the database tables of the target data storage system 255. This may be the case when the data migration tool 200 and the target system 250 are parts of the same computer system or different programs running on the same computer system. Such a reduction of database tables may be implemented for example by using generated coding to generate reduced database tables. In a further example, different target schemas may correspond to different database table models and a database table model may be selected according to a selected target schema based on a user input. In a different example, the target schema may not be changed but matches of elements of the reduced target schema to the original target schema may be automatically generated. Following matches are then created between elements of the source schema and elements of the reduced target schema.

Figure 2C:
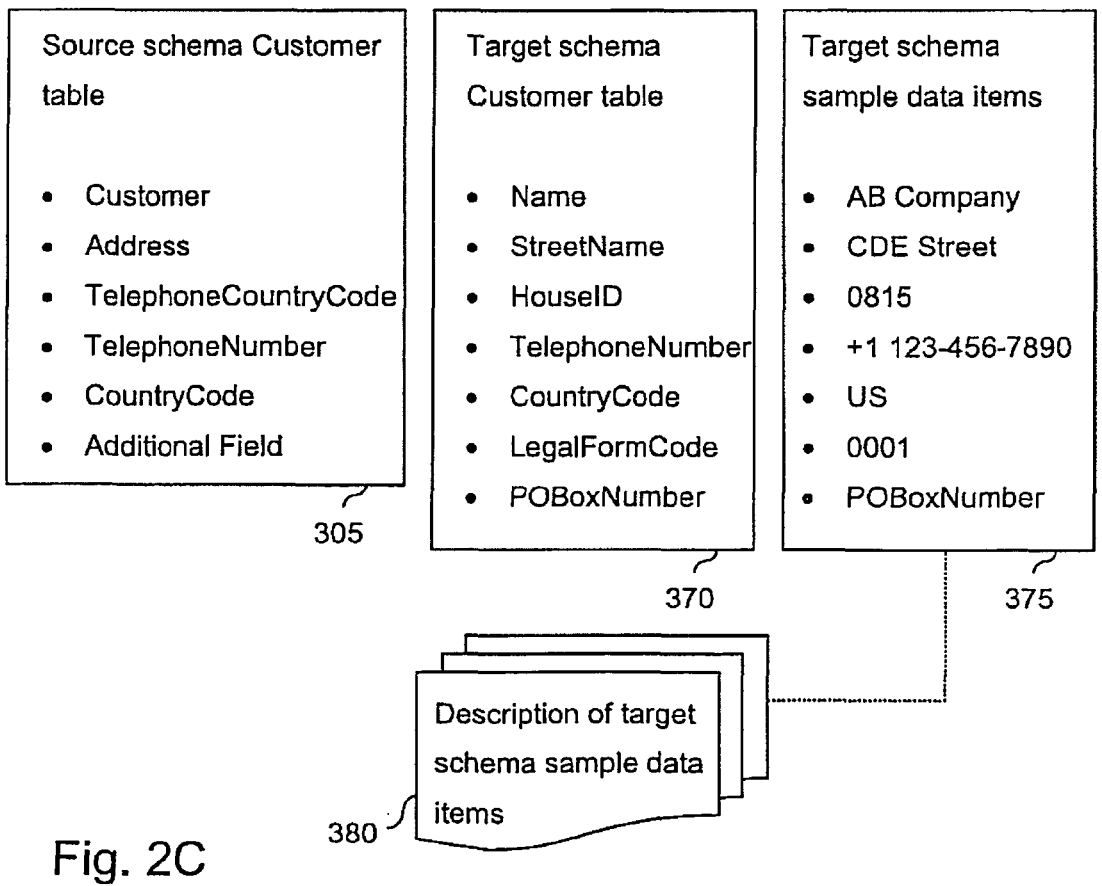
FIG. 2C is a block diagram of an example source schema, an example target schema, and example target schema sample data items.

FIG. 2C is a block diagram of an example source schema 305, an example target schema 370, and example target schema sample data items 375. Related to the example target schema sample data items 375 is a description 380 of target schema sample data items.

In an example, the example target schema sample data items 375 represent a sample instance of the target schema represented by the target schema Customer table 370. The description 380 of target schema sample data items is an example of how to provide one or more than one sample data items through an interface. The description 380 of target schema sample data items may be provided to a user so that the user is able to create a sample instance of the source schema. This may be accomplished by using for example an application program of the source system 210 in use and to be replaced. The description 380 of target schema sample data items may be displayed on a monitor or printed out on a printer to be entered in the source system 210.

Figure 2D:
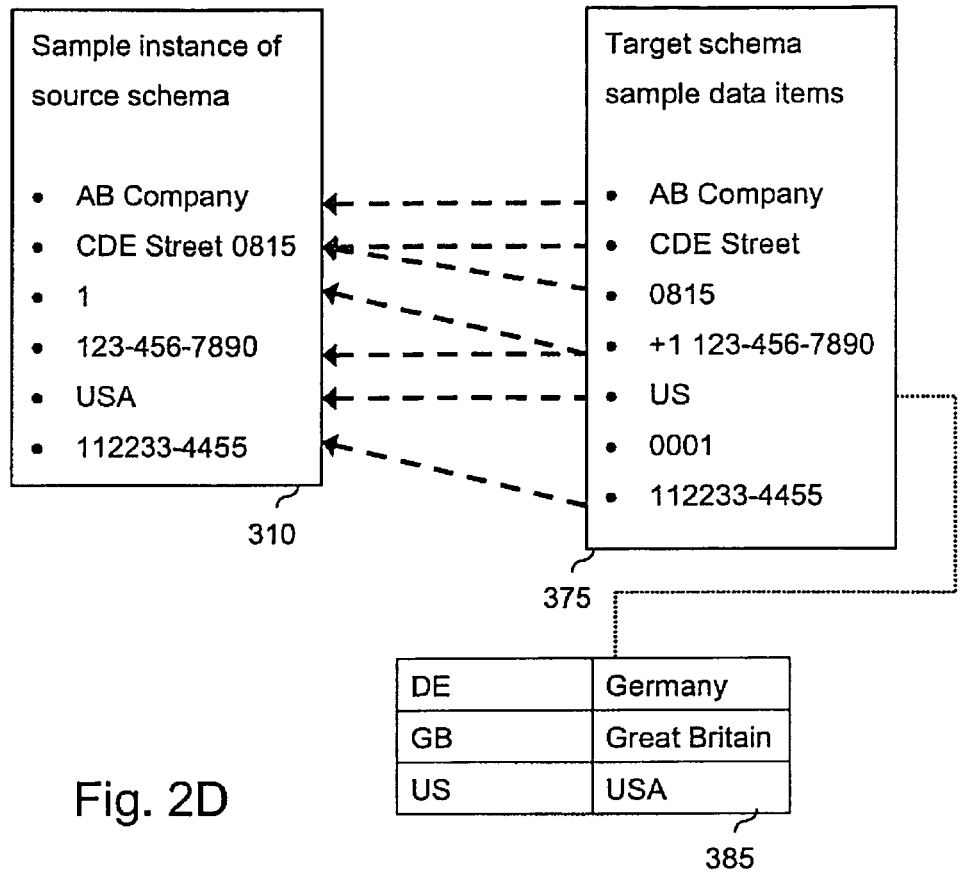
FIG. 2D is a block diagram of matches between an example sample instance of a source schema and example target schema sample data items.

FIG. 2D is a block diagram of matches between an example sample instance 310 of a source schema and example target schema sample data items 375. The example target schema sample data items 375 may represent a sample instance of the target schema and one or more of the target schema sample data items may be unique parts of a sample instance of the target schema. A metadata table 385 is related to one of the target schema sample data items 375.

The items of the sample instance 310 of the source schema correspond directly to the elements of the source schema, that is, to the fields of the source schema Customer table 305 (see. FIG. 2B). Similarly, the target schema sample data items 375 correspond directly to the elements of target schema, that is, to the fields of the target schema Customer table 370.

In an example, a sample data item of the sample instance of the target schema may be created in such a way that characters or combinations of characters are unique within the sample instance of the target schema. This may render a string search in the sample instance of the source schema more efficient and more reliable.

The processing unit 110 (see FIG. 1) may be configured to match a part of the sample data item to a part of the sample instance 310 of the source schema. This may include searching the sample instance 310 of the source schema for an expression that corresponds to the part of the sample data item. The resulting matches are represented by arrows with broken lines. Accordingly, the source schema may be searched for expression "AB Company" being a sample data item of the target schema instance. The search result gives a match of content of the first element of the source schema 305 and the content of the first element of the target schema 370. The content of the first element of the source schema 305 may be identified with a part of the sample instance 310 of the source schema. The content of the first element of the target schema 370 may be identified with a part of a sample data item from the target schema sample data items 375.

Following match results may be that the content of the second element of the target schema and the content of the third element of the target schema are identical to the content of the second element of the source schema. Also, the content of the fourth element of the target schema may be matched to the content of the third element of the source schema and the fourth element of the source schema. A search for parts of the content of the fourth element of the target schema may be accomplished by using machine-readable metadata related to or assigned to the fourth element of the target schema. The metadata may include a structure of the fourth element of the target schema distinguishing between different parts of the fourth element of the target schema. The metadata may be an example of a split prescription between a set of data items. The split prescription may describe how to split or concatenate parts of an element of the source schema or the target schema. In an example, the sample data item of the fourth element of the target schema is one sample data item of the set of data items. The set of sample data items may be a part of the input of the split prescription that is split up or a part of the output of the split prescription that are the split up parts. The split prescription may include how to split up the fourth element of the target schema to obtain parts of the corresponding sample data item for which a search may be done. In an example, the fourth element of the target schema representing a telephone number may consist of a country code part, an area number part, a subscribed number part, and an extension number part. A search may then be executed for the different parts of the content of the fourth element of the target schema. Such a search may be directly successful in an example, because the source schema stores the complete telephone number in two parts one of which is the country code and one of which are the remaining digits of the telephone number. In a further example, a search for parts of the content of the fourth element of the target schema may be executed following an unsuccessful search of the complete content of the fourth element of the target schema.

A match result may be that the content of the fifth element of the target schema matches to the content of the fifth element of the source schema. The match result may be accomplished by using machine-readable metadata 385 related to the fifth element of the target schema. The metadata 385 are an example of a conversion table between a standardized format of the sample data item and a further standardized format of the sample data item. The left column of the metadata 385 contains ISO codes of the International Organization for Standardization and the right column the English country name. Using the metadata 385 a search for the expression "USA" may be successful in the sample instance of the source schema.

A search for the content of the sixth element of the target schema may not be successful. In an example, such a search may not be started because metadata of the sixth element of the target schema may indicate that this is an element with a default value that depends on the application program. The metadata may be machine-readable so that the processing unit 110 (see FIG. 1) of the data migration tool 100 (see FIG. 1) may be configured to use the metadata. In a further example, a source schema may have a default value element that corresponds to a default value element of a target schema. In such a case, the processing unit 110 may match the default value element of the source schema to the default value element of the target schema. For this, the processing unit 110 may use machine-readable metadata related to the default value element of the target schema. The metadata may characterize the default value element as having a default value and specify the default value of the default value element. A match of the default value element of the source schema to the default value element of the target schema may then mean that a value of the default value element of the source schema is replaced by the default value of the default value element of the target schema.

The content of the seventh element of the target structure may be matched to the sixth element of the source structure. In an example, machine-readable metadata related to the seventh element of the target structure may include a conversion table between a data type of the seventh element of the target schema and a further data type. The data type of the seventh element may for example be a field made of numbers and mathematical signs and the further data type may for example be a field made of characters. Such a conversion table between different data types may be used to find a match even if the identical data have been stored in the source system 210 and the target system 250.

Figure 2E:
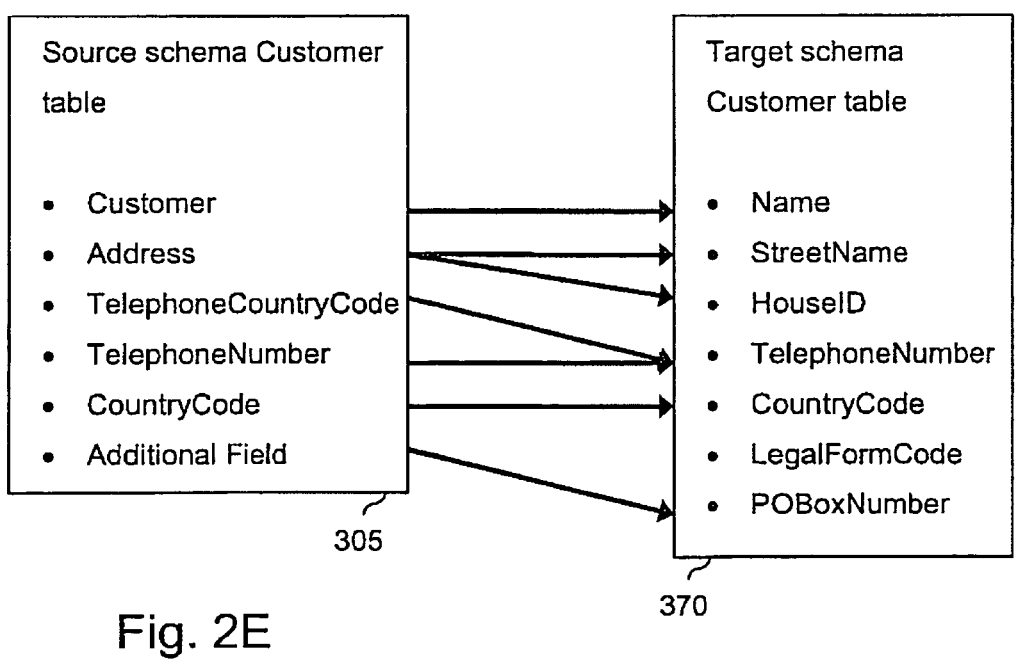
FIG. 2E is a block diagram of matches between an example source schema and an example target schema.

FIG. 2E is a block diagram of matches between an example source schema 305 and an example target schema 370. In an example, the elements of the source schema 305 are identified that correspond one-to-one to the contents of the elements of the source schema 305, that is, the parts of the sample instance of the source schema 310. Furthermore, the elements of the target schema 370 are identified that correspond to the contents of the elements of the target schema 370, that is, the target schema sample data items 375. The matches of the contents of the elements of the target schema 370 to the contents of the elements of the source schema 305 may be then reversed to match the elements of the source schema 305 to the elements of the target schema 370.

The processing unit 110 (see FIG. 1) may be further configured to compute a match value for each match of an element of a source schema to an element of the target schema. The match value may represent a likelihood that the element of the source schema matches to the element of the target schema. The match value may for example depend on the number of characters of the length of a part of the sample data item. A matched part of the sample data item that has a larger number of characters may be less likely a result of an accidental match and may lead to a greater likelihood value, that is, the match value for the resulting match of the elements. Also, a match of elements that involves a split or a concatenation of data may influence a likelihood value. Furthermore, a comparison of the names of the schema elements that are matched may be done to compute a contribution to a likelihood value. Likelihood values for matches of schema elements may be used for deciding which match is selected when more than one potential match has been computed. In such a case of conflicting potential matches the match with the greatest likelihood value may be selected. In a further example, a match with a likelihood value below a limit value may be brought to the attention of a user. The user may then apply further checks if the match is correct or not.

Figure 3:
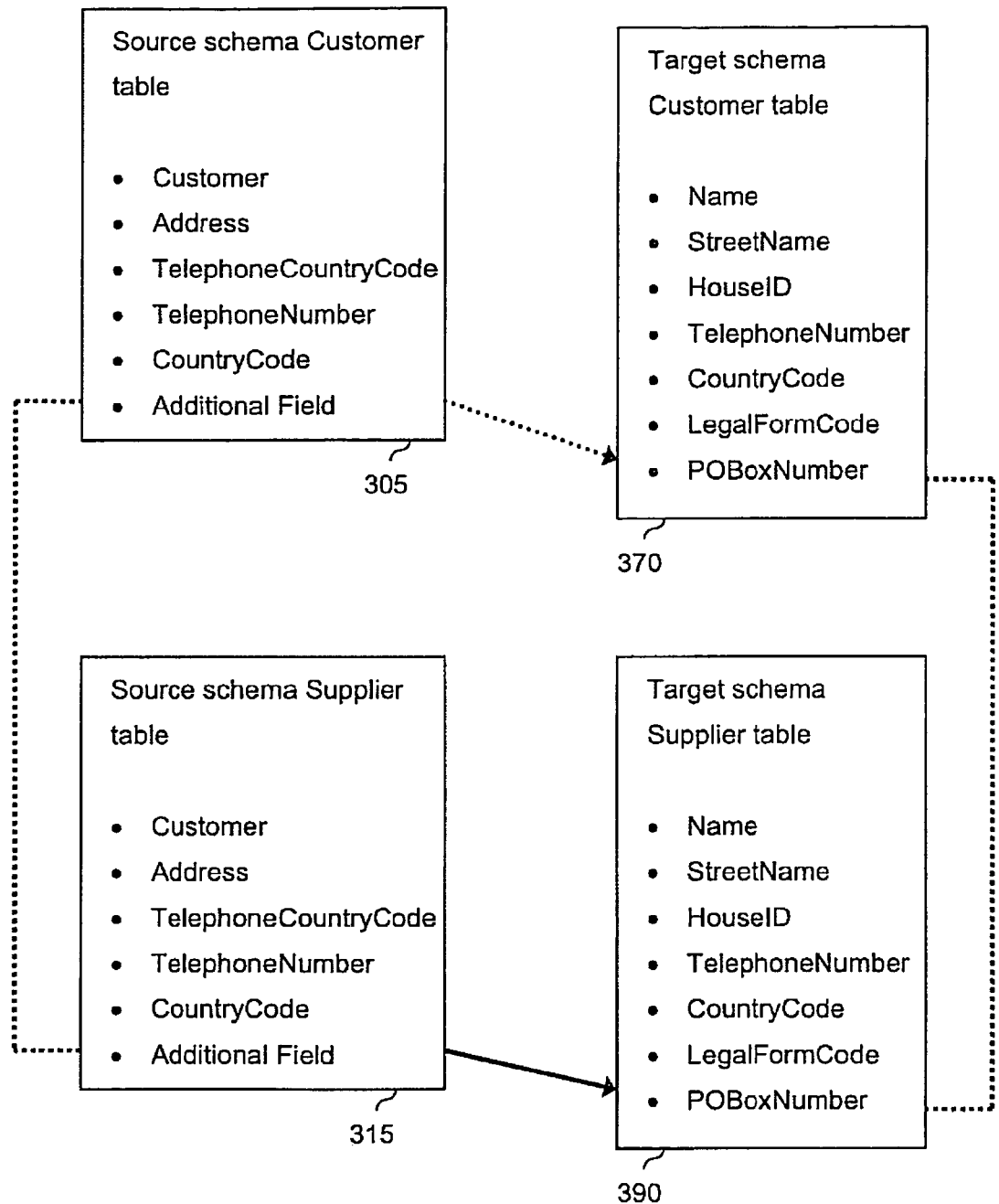
FIG. 3 is a block diagram of a match between a further element of an example source schema and a further element of an example target schema using a prior match result.

FIG. 3 is a block diagram of a match between a further element of an example source schema and a further element of an example target schema using a prior match result. The example source schema includes a source schema Supplier table 315 and the source schema Customer table 305. The example target schema includes a target schema Supplier table 390 and the target schema Customer table 370. The prior match result includes the match of the sixth field of the source schema Customer table 305 to the seventh field of the target schema Customer table 370.

A data type repository, data dictionary, or a further data base table may for example relate the sixth field of the source schema Supplier table 315 to the sixth field of the source schema Customer table 305. Such a relation may allow for a match of the sixth field of the source schema Supplier table 315 to the sixth field of the source schema Customer table 305. Similarly, a relation may be established between the seventh field of the target schema Customer table 370 and the seventh field of the target schema Supplier table 390. The relation may be used to match the seventh field of the target schema Customer table 370 to the seventh field of the target schema Supplier table 390. In a further example, a relation between fields or elements of the source schema may be established by matching the elements of the source schema. Such a match may be reliable and efficient in case of a consistent use of the elements of the source schema in different tables of the source schema. Relations between elements of the target schema may be established in a similar way or the relations may be part of the target schema and assigned as metadata to one or more elements of the target schema. In an example, a relation between a first element of the target schema and a second element of the target schema may be implemented as metadata of the first element including an identifier of or pointer to the second element. The metadata of the second element may include an identifier of or pointer to the first element.

The resulting match of the field of the source schema Supplier table 315 to the field of the target schema Supplier table 390 may be computed by the processing unit 110. For this, the processing unit 110 may be further configured to match the further element of the source schema, that is, the sixth field of the source schema Supplier table 315, to a further element of the target schema, that is, the seventh field of the target schema Supplier table 390. This may further include using the match of the further element of the source schema to a match element of the source schema, that is, the sixth field of the source schema Customer table 305. The match element of the source schema matches to a match element of the target schema, that is, the seventh field of the target schema Customer table 370. The match element of the target schema matches to the further element of the target schema, that is, the seventh field of the target schema Supplier table 390.

The processing unit 110 may analyze relations between known matches of elements regularly to identify implicit matches such as the match between the sixth field of the source schema Supplier table 315 and the seventh field of the target schema Supplier table 390.

Figure 4:
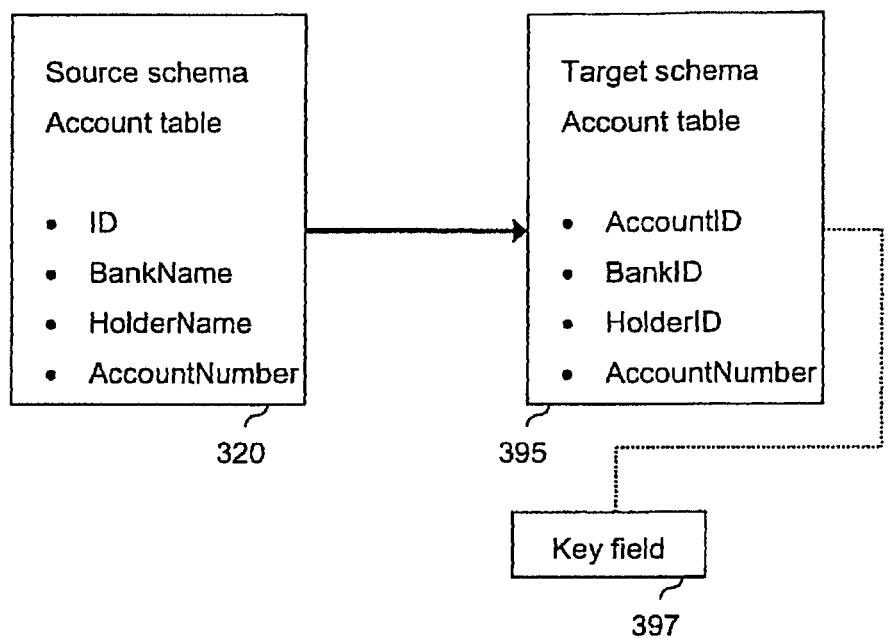
FIG. 4 is a block diagram of matches between an example source schema and an example target schema using metadata.

FIG. 4 is a block diagram of matches between an element of an example source schema and an element of an example target schema using metadata 397. The element of the example source schema is identical to the first field of the source schema Account table 320 and the element of the example target schema is the first field of the target schema Account table 395.

The processing unit 110 of the data migration tool 100 may be configured to match the further element of the source schema to the further element of the target schema by using the metadata 397. The metadata 397 may be machine-readable and may be related to the element of the target schema by an assignment to the element of the target schema. Such an assignment may be implemented by an identification of the target schema Account table 395 and the field of the target schema Account table 395.

The machine-readable metadata 397 may be a characterization of the further element of the target schema as a key field. A key field may be used for unique identifiers for example of a record or instance of a data base table. A content of a key field may be generated by for example by an application program or a data base system running on the target system or the source system. A key field may be an internal key field that is generated according to specific rules by a program accessing the internal key field. A key field may also be an external key field that may be provided by a program or system that may be different from the program accessing directly the external key field. In a further example, the metadata may also specify if a key field is an internal key field or an external key field.

In an example, the first field of the target schema Account table 397 may be an external key field. Accordingly, a matching of the further element "ID" of the source schema to the further element "AccountID" of the target schema may mean that contents of the further element "ID" of the source schema are copied or moved to contents of further element of the target schema "AccountID".

In a further example, the first field of the target schema Account table 397 may be an internal key field. Accordingly, a matching of the further element "ID" of the source schema to the further element "AccountID" of the target schema may mean that contents of further element of the target schema "AccountID" are generated consistently by a program running on the target system 250. This may be the case when for example the contents of the field "AccountID" have to be consecutive numbers of a number range.

FIG. 5 is an example table of matches between source schema elements and target schema elements and mapping functions to migrate data according to the matches.

A column of the table that may be also a list specifies the source schema elements that are from the source schema Customer table 305 (see FIG. 2E). A further column of the table specifies the target schema elements that are from the target schema Customer table 370 (see FIG. 2E). In a further example, the source schema or the target schema may include more than one database table and the entries in the cells of the table or list may also specify the database table to which the element belongs.

A further column of the table specifies the mapping function that may be used to execute the transfer of data from the source data storage system 215 (see FIG. 1) to the target data storage system 250 (see FIG. 1). The processing unit 110 may be configured to determine a mapping function for a match between a source schema element and a target schema element. The mapping function may be configured to migrate data of the source schema to the target schema. This may be accomplished by converting one or more instance items of the source schema to one or more instance items of the target schema.

In an example, an instance item of the source schema may be the content of a field "Customer" of a record in the source schema Customer table 305. An instance item of the target schema may be the content of a field "Name" of a record in the target schema Customer table 370. The instance item of the source schema may be mapped to an instance item of the target schema using the "Move function" as a mapping function. The "Move function" function may be configured to move or copy the instance item of the source schema to the instance item of the target schema. Further functions of the column for the mapping functions include a "Split function" configured to split an instance item of the source schema to a set of instance items of the target schema and a "Concatenate function" configured to concatenate a set of instance items of the source schema to an instance item of the target schema.

In an example, a "Value mapping function" is configured to convert the instance item of the source schema to the instance item of the target schema. The instance item of the target schema has a value that is different from the instance item of the source schema. In an example, the "Value mapping function" uses a conversion table such as metadata table 385 (see FIG. 2D) to migrate data from the source data storage system 215 to the target data storage system 255. In a further example, a predefined conversion table may not be accessible and a value mapping function may be further configured to write an entry in a value mapping table.

In an example, a "Default value function" may be configured to migrate to migrate data from the source data storage system to the target data storage system. The "Default value function" may be used when an element of the source schema is matched to an element of the target schema or when no element of the source schema is matched to an element of the target.

A "Code2Text function" may be used to migrate data when the source schema element is defined as a code field using for example numbers and the target schema element is defined as a text field using for example characters. In a further example, the "Code2Text function" may be used when the schema element is defined as a code field using integers and the target schema element is defined as a text field with talking descriptions. In such a case, a code value "01" may for example be matched to a text "payable in 14 days" and a code value "02" may be matched to a text "payable immediately".

In a further example, a mapping function may be configured to convert an instance item of the source schema that is a key value to an instance item of the target schema that is a key value. Such a mapping function may be used for example for migrating internal key field values or external key field values.

In a further example, a mapping function may be configured to query with one or more instance items of the source schema a further instance item of the target schema. The further instance item of the target schema may be a key value and the mapping function may identify an instance item of the target schema with the further instance item of the target schema. Such a mapping function may be used when, for example, the instance item of the target schema is used as a foreign key value in a further database table of the target schema. The instance item is then identical to the further instance item of the target schema. The further instance item is a unique key value and may be identified by querying the further database table with the one or more instance items of the source schema. In a more specific example, the target schema Account table 395 may have a further instance item stored under element "AccountID". The further instance item may be identified by querying the target schema Account table 395 (see FIG. 4) with instance items of the source schema that specify contents of "BankID", "HolderID", and "AccountNumber". The obtained further instance item may then be used as the instance item of a database table that also has the element "AccountID".

In a further example, a mapping function may be a combination of mapping functions such as a split function with one of the split parts using a value mapping function. In case of reuse of prior match results (see FIG. 3) conflicts may occur. It may for example be possible that one element of the source schema may be relatable to two different elements of the source schema each of them being matched to different target schema elements. The two different elements of the source schema may be mutually excluding because the different elements may not be matchable. Such a conflict may lead to a mapping function defined as a complex mapping function. A complex mapping function may not execute a data migration or may execute a data migration with further manual input from a user. A conflict may also arise when two different and mutually excluding elements are related to one further element.

Figure 6:
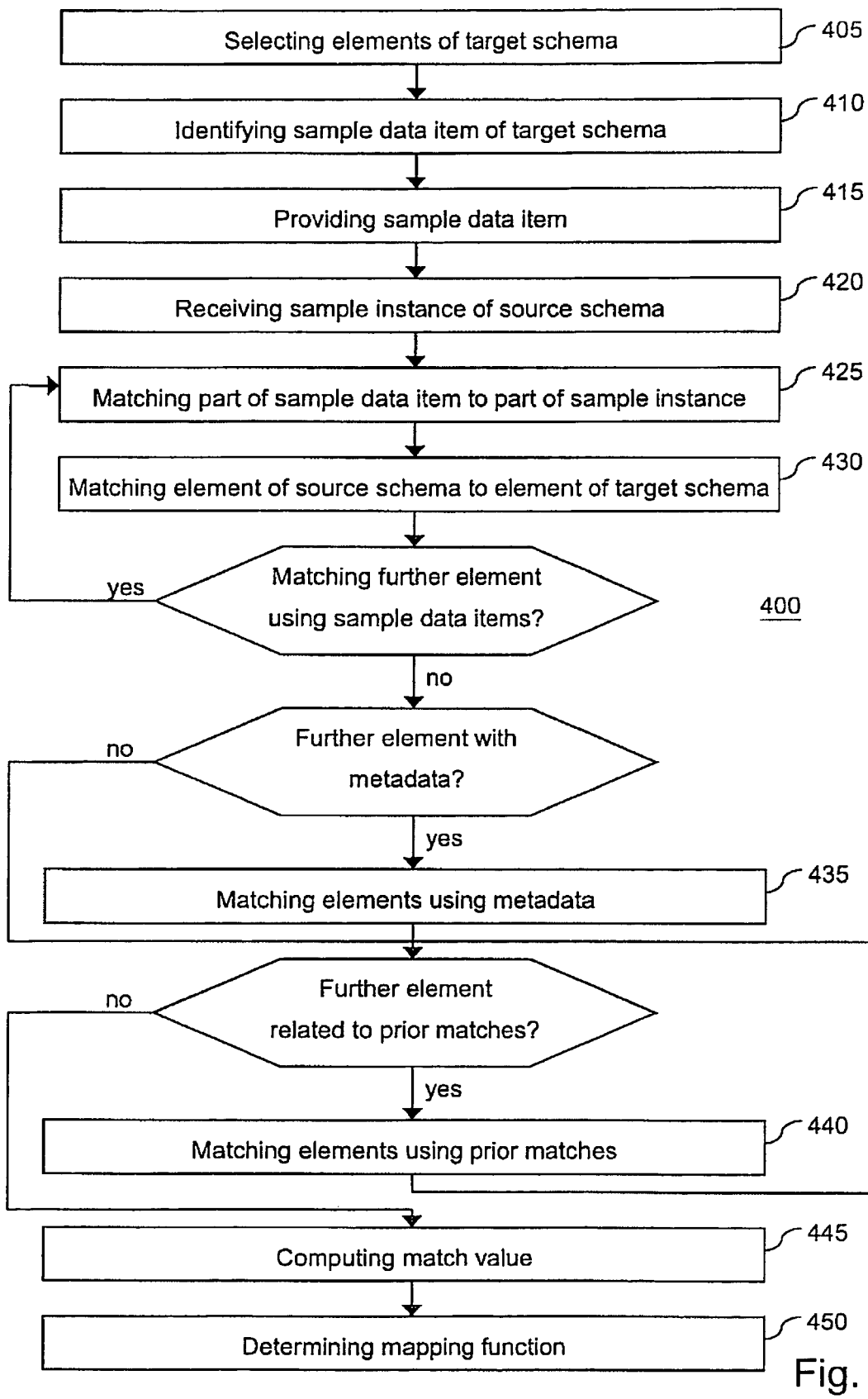
FIG. 6 is flow diagram of an example method, according to an embodiment.

FIG. 6 is flow diagram of an example method 400, according to an embodiment. The example method 400 may be a computer-implemented method for matching an element of a source schema to an element of a target schema.

An operation of the method may be selecting 405 the element of the target schema from elements of an initial target schema according to selection criteria that are computed in response to a user input.

Identifying 410 a sample data item of the element of the target schema may be a following operation together with providing 415 the sample data item through an interface. The provided sample data item may be used by a user or a software programs to create a sample instance of the source schema.

The method may include receiving 420 the sample instance of the source schema that may have been created using the sample data item of the target schema.

Matching 425 a part of the sample data item to a part of the sample instance of the source schema may follow. The sample data item may be a unique part of a sample instance of the target schema. Matching 425 may include searching the sample instance of the source schema for an expression that corresponds to the part of the sample data item. Matching 425 may include using machine-readable metadata. The metadata may be, for example, a conversion table between a data type of the element of the target schema and a further data type, a conversion table between a standardized format of the sample data item and a further standardized format of the sample data item, or a split prescription between a set of data items one of which is the sample data item.

The resulting match may be used to an operation of matching 430 the element of the source schema to which the part of the sample instance of the source schema belongs to the element of the target schema.

A check may follow if further elements may be matched using sample data items. In an example, a complete instance of the target schema may be accessible. The complete instance of the target schema may include many sample data items. A user may have used the provided sample data items to create a complete instance of the source schema with many different parts. As long as there are left elements of the source schema that may be matched using matches of sample data items to parts of the sample instance matching 425 and matching 430 may be repeated. In a further example, also identifying, providing 415, and receiving 420 may be repeated prior to matching 425 and matching 430.

A further check may be if a further element of the target schema is related to machine-readable metadata that are required for matching the further element. Such required metadata may be, for example, a characterization of the element of the target schema as a key field or a default value of the element of the target schema. In the event of a positive result of the check it may follow matching 435 elements using the metadata.

Matching 440 schema elements using prior matches may include matching a further element of the source schema to a further element of the target schema. For this, a match of the further element of the source schema to a match element of the source schema may be used. The match element of the source schema may have been previously matched to a match element of the target schema. The match element of the target schema may match to the further element of the target schema. The match of the further element of the source schema to the match element of the source schema may be determined in an efficient and reliable computation. In an example, the further element of the source schema and the match element of the source schema may be defined by an identical field of a data field repository. In the data dictionary, it may further be specified that the different schema elements are related by having the same type of content. Matching 440 schema elements using prior matches may be repeated as long as further elements with related prior matches are available.

The method 400 may include computing 445 a match value representing a likelihood that an element of the source schema matches to an element of the target schema. In an example, a match value may be computed for each element match. A person skilled in the art may appreciate that many different contributions or algorithms for computing 445 a match value may be considered.

The method 400 may have an operation determining 450 a mapping function configured to migrate data of the source schema to the target schema. For this, the mapping function may convert one or more instance items of the source schema to one or more instance items of the target schema.

Examples of mapping functions include: a function configured to move an instance item of the source schema to an instance item of the target schema, a function configured to convert an instance item of the source schema to an instance item of the target schema that has a value that is different from the instance item of the source schema and to write an entry in a value mapping table, a function configured to split an instance item of the source schema to a set of instance items of the target schema, a function configured to concatenate a set of instance items of the source schema to an instance item of the target schema, a function configured to convert the instance item of the source schema that is a key value to the instance item of the target schema that is a key value, and a function configured to query with one or more instance items of the source schema a further instance item of the target schema that is a key value and identify an instance item of the target schema with the further instance item of the target schema.

Figure 7:
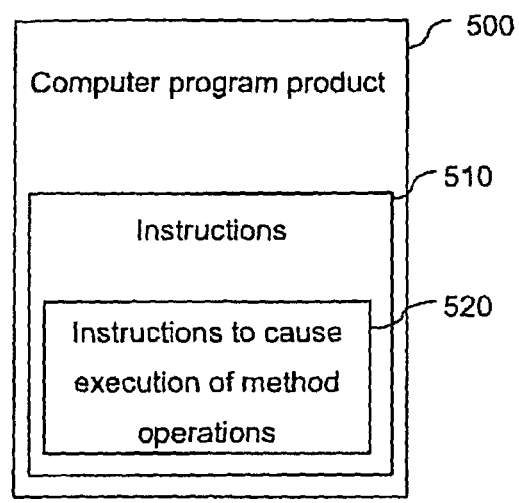
FIG. 7 is block diagram of an example computer program product, according to an embodiment.

FIG. 7 is block diagram of an example computer program product 500, according to an embodiment. The computer program product 500 includes instructions 510 that can be loaded into a memory of a computer system and can be executed by the computer system. A portion of the instructions 510 are instructions 520 that are configured to cause the computer system to execute operations of a method according to an embodiment.

In an example, the instructions 520 may cause a computer system to execute operations of identifying 410 (see FIG. 6) a sample data item of the element of the target schema, providing 415 (see FIG. 6) the sample data item through an interface, receiving 420 (see FIG. 6) a sample instance of the source schema, matching 425 (see FIG. 6) a part of the sample data item to a part of the sample instance of the source schema, and matching 430 (see FIG. 6) the element of the source schema to which the part of the sample instance of the source schema belongs to the element of the target schema.

In a further example, the instructions 520 may implement one or more further operations of the example method 400 (see FIG. 6).

As noted, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for matching an element of a source schema to an element of a target schema, the system comprising:
    a processing unit configured to identify a sample data item of the element of the target schema, match a part of the sample data item to a part of a sample instance of the source schema, and match the element of the source schema to which the part of the sample instance of the source schema belongs to the element of the target schema; and
    a communication unit configured to provide the sample data item through an interface, and receive the sample instance of the source schema.

2. The system of claim 1, wherein the processing unit is further configured to select the element of the target schema from elements of an initial target schema according to selection criteria that are computed in response to a user input.

3. The system of claim 2, wherein the sample data item is a unique part of a sample instance of the target schema and wherein the processing unit is configured to match the part of the sample data item to the part of the sample instance of the source schema by searching the sample instance of the source schema for an expression that corresponds to the part of the sample data item.

4. The system of claim 3, wherein the processing unit is configured to match the part of the sample data item to the part of the sample instance of the source schema by using machine-readable metadata related to the element of the target schema.

5. The system of claim 4, wherein the machine-readable metadata is any one of a group of metadata comprising: a conversion table between a data type of the element of the target schema and a further data type; a conversion table between a standardized format of the sample data item and a further standardized format of the sample data item; and a split prescription between a plurality of data items, the sample data item being one of the plurality of data items.

6. The system of claim 1, wherein the processing unit is further configured to match a further element of the source schema to a further element of the target schema by using machine-readable metadata related to the further element of the target schema.

7. The system of claim 1, wherein the processing unit is further configured to match a further element of the source schema to a further element of the target schema by using a match of the further element of the source schema to a match element of the source schema that matches to a match element of the target schema, the match element of the target schema matching to the further element of the target schema.

8. The system of claim 1, wherein the processing unit is further configured to compute a match value representing a likelihood that the element of the source schema matches to the element of the target schema.

9. The system of claim 1, wherein the processing unit is further configured to determine a mapping function configured to migrate data of the source schema to the target schema by converting one or more instance items of the source schema to one or more instance items of the target schema.

10. A computer-implemented method for matching an element of a source schema to an element of a target schema, the method comprising:
   identifying a sample data item of the element of the target schema;
   providing the sample data item through an interface;
   receiving a sample instance of the source schema;
   matching a part of the sample data item to a part of the sample instance of the source schema; and
   matching the element of the source schema to which the part of the sample instance of the source schema belongs to the element of the target schema.

11. The computer-implemented method of claim 10, further comprising selecting the element of the target schema from elements of an initial target schema according to selection criteria that are computed in response to a user input.

12. The computer-implemented method of claim 11, wherein the sample data item is a unique part of a sample instance of the target schema and wherein matching the part of the sample data item to the part of the sample instance of the source schema comprises searching the sample instance of the source schema for an expression that corresponds to the part of the sample data item.

13. The computer-implemented method of claim 12, wherein matching the part of the sample data item to the part of the sample instance of the source schema comprises using machine-readable metadata related to the element of the target schema.

14. The computer-implemented method of claim 13, wherein the machine-readable metadata is any one of a group of metadata comprising: a conversion table between a data type of the element of the target schema and a further data type; a conversion table between a standardized format of the sample data item and a further standardized format of the sample data item; and a split prescription between a plurality of data items, the sample data item being one of the plurality of data items.

15. The computer-implemented method of claim 10, further comprising matching a further element of the source schema to a further element of the target schema by using machine-readable metadata related to the further element of the target schema.

16. The computer-implemented method of claim 10, further comprising matching a further element of the source schema to a further element of the target schema by using a match of the further element of the source schema to a match element of the source schema that matches to a match element of the target schema, the match element of the target schema matching to the further element of the target schema.

17. The computer-implemented method of claim 10, further comprising computing a match value representing a likelihood that the element of the source schema matches to the element of the target schema.

18. The computer-implemented method of claim 10, further comprising determining a mapping function configured to migrate data of the source schema to the target schema by converting one or more instance items of the source schema to one or more instance items of the target schema.

19. A non-transitory computer-readable medium having a computer program product embodied thereon, wherein the computer program product comprises computer-readable instructions, which, when executed by a computer system, causes the computer system to:
   identify a sample data item of the element of the target schema;
   provide the sample data item through an interface;
   receive a sample instance of the source schema;
   match a part of the sample data item to a part of the sample instance of the source schema; and
   match the element of the source schema to which the part of the sample instance of the source schema belongs to the element of the target schema.

20. The non-transitory computer-readable medium of claim 19, wherein the computer program product comprises additional computer-readable instructions, which, when executed by a computer system, causes the computer system to:
   match a further element of the source schema to a further element of the target schema by using machine-readable metadata related to the further element of the target schema.

* * * * *